Patented Oct. 11, 1949

2,484,315

UNITED STATES PATENT OFFICE 2,484,315

NITROALCOHOL MODIFIED AMINOPLASTS

Milton J. Scott, Springfield, Mass., assignor to Monsanto Chemical Company, St. Louis, Mo., a corporation of Delaware No Drawing. Application September 25, 1945, Serial No. 618,587

1 Claim. (Cl. 260—67.6)

This invention relates to modified alkylol aminotriazine resins and the process for preparing them. More particularly the invention relates to alkylol melamines modified with nitro alcohols. The invention further relates to compositions containing nitro-alcohol modified alkylol melamines and to textiles or other fibrous materials treated therewith.

It is well known to react alkylol aminotriazines with unsubstituted alcohols to form so-called alkylol aminotriazine ethers. The known ethers are used in various textile and paper sizing processes and in protective coatings. They possess several disadvantages; (1) they have a limited compatibility with alkyd resins; (2) they are relatively slow curing; (3) they tend to pick up undesirable anions when applied to textiles; (4) they become less soluble in water as the number of "ether" groups per molecule is increased. The resins of this invention have been found to overcome the disadvantages inherent in the prior art alkylol aminotriazine-alcohol reaction products.

It is an object of this invention to provide new chemical compositions.

A further object is to provide new reaction products of alkylol aminotriazine.

Another object is to provide nitro-alcohol modified alkylol melamines.

These and other objects are attained by reacting alkylol aminotriazines with nitro-alcohols in the presence of acid catalysts.

The following examples are given in illustration of this invention and are not intended to limit the scope thereof. Where parts are mentioned they are parts by weight.

Example I 206 parts of crystalline hexamethylol melamine (1 mol) were suspended in a mixture of 1200 parts (10 mols) of 2-nitro-2-methyl-1-propanol and 2 parts (0.03 mol) of concentrated hydrochloric acid. The mixture was then refluxed at atmospheric pressure for one hour. During the refluxing action the crystalline hexamethylol melamine dissolved and a clear slightly yellow solution of a modified methylol melamine in 2-nitro-2-methyl-1-propanol was obtained. The resinous product was recovered from solution by evaporation of the solvent under vacuum.

Example II 206 parts (1 mol) of hexamethylol melamine were mixed with 1500 parts (10 mols) of tris (hydroxy methyl) nitro methane and 5 parts (0.05 mol) of sulphuric acid. The mixture was heated under reflux for 2 hours at atmospheric pressure. A clear slightly yellow solution of a modified methylol melamine in tris (hydroxy methyl) nitro methane was obtained from which a slightly yellow resin was obtained by evaporation under vacuum.

According to another embodiment of this invention mixtures of other alcohols with nitro-alcohols may be reacted with the alkylol aminotriazine.

Example III 206 parts (1 mol) of hexamethylol melamine were suspended in 120 parts (6 mols) of methanol. 453 parts (3 mols) of tris (hydroxy methyl) nitro-methane, and 5 parts (0.03 mol) of toluene sulphonic acid were added to the suspension and the mixture was refluxed at atmospheric pressure for 1½ hours. A clear nearly colorless methanol solution was obtained from which a water soluble resin was recovered by vacuum evaporation.

Other alcohols may be substituted for the methanol of Example III such as ethanol, propanol, butanol, benzyl-alcohol, etc. The relative amounts of the two reacting alcohols may be varied with the nitro-alcohol sufficient to constitute up to about 95% of the alcohol mixture reacted or as little as about 5% of the alcohol mixture reacted.

Aminotriazines having fewer than 6 alkylol groups per mol may also be reacted with a mixture of nitro-alcohol and unsubstituted alcohols. The reactivity of the nitro-alcohols appears to be greater than that of the unsubstituted alcohols with the result that the reaction between the nitro-alcohol and the alkylol aminotriazine takes place more rapidly and apparently at times at the expense of already reacted unsubstituted alcohols. Thus the unsubstituted alcohol may be reacted with the amino-triazine and aldehyde and the product subsequently reacted with the nitro-alcohol.

In a further embodiment of this invention the nitro-alcohol reaction products may be obtained by starting with a reaction mixture of amino-triazine, aldehyde and nitro-alcohol with or without incorporating an unsubstituted alcohol.

Example IV 126 parts (1 mol) of melamine were mixed with 380 parts (5 mols) of formalin (37% formaldehyde), 592 parts (8 mols) of butanol and 302 parts (2 mols) of tris (hydroxy methyl) nitromethane. The pH of the mixture was adjusted to about 6 to 7 with alkali and the temperature of the mixture was raised until azeotropic distillation of butanol and water began. The reaction was continued at this temperature and the butanol rich phase of the distillate continuously returned to the reaction until only a single phase was found in the distillate. At this point anhydrous butanol was added to the reaction mixture and wet butanol distilled from the mixture until the specific gravity of the distillate indicated that substantially all of the water had been removed from the mixture. The mixture was then concentrated by vacuum distillation and xylol was added to the concentrate to obtain a clear substantially colorless syrup.

The melamine shown in the above examples may be replaced in whole or in part by other aminotriazines such as 2,4-diamino-1,3,5-triazine, 2-amino-1,3,5-triazine, melam, melem, aminotriazines in which one or two amino groups are substituted by hydroxy, halogen, alkyl, aryl, or aralkyl groups such as 2-hydroxy-4,6-diamino-1,3,5-triazine, 2,4-dihydroxy-6-amino-1,3,5-triazine, 2-chloro - 4,6-diamino-1,3,5 - triazine, 2-p-hydroxy phenylene-4,6-diamino-1,3,5-triazine, 2 - phenyl-4-amino-6-hydroxy-1,3,5-triazine, aminotriazines wherein the hydrogen atoms of the amino groups are partially substituted by amino, alkyl, aryl or aralkyl groups such as mono-, di-, or tri-alkyl-melamines, e. g., 2,4,6-triethyl-triamino-1,3,5-triazine, mono-, di-, or tri-aralkyl, or mono-, di-, or tri-aryl melamines, e. g., 2,4,6-triphenyl-tri-amino-1,3,5-triazine, etc. Mixtures of aminotriazines may also be used.

The solutions obtained in Examples I and II may be stabilized by neutralization or buffering with bases, alkalies or quaternary ammonium bases and the solution then used without further modification.

The resinous products may be obtained from the solution after stabilization by conventional methods such as vacuum drying or oven drying.

The resins obtained varied in water solubility according to the nature of nitro alcohol used. For example, resins made with 2-nitro-2-methyl-1-propanol was partially soluble in water whereas the resin made with tris (hydroxy methyl) nitro methane was soluble in water in all proportions.

In place of all or part of the nitro alcohols shown in the above examples other nitro alcohols may be used such as 2-nitro-1-butanol, 2-nitro-2-methyl-1,3-propanediol, 2 - nitro-2-ethyl - 1,3-propanediol. Mixtures of the nitro alcohols may also be employed. One or more mols of the nitro alcohols may be used for each mol of alkylol aminotriazine depending on the product desired.

Hydrochloric and sulphuric acids are shown in the examples as catalysts for the reaction. They may be replaced by other inorganic or organic acids, such as phosphoric, nitric, oxalic, phthalic, chlorosulfonic, toluene sulfonic, etc.

The methylol melamine of the example may be replaced by melamines having fewer methylol groups such as tri-, or tetra-methylol groups such as tri-, or tetra- methylol melamine or by methylol derivatives of other aminotriazines. Similarly the condensation products of aminotriazines with aldehydes, other than formaldehyde, such as acetaldehyde, butyraldehyde, crotonaldehyde, acrolein, cinnamaldehyde, benzaldehyde, furfural, etc. may be reacted with the nitro-alcohols.

The resinous products of this invention may be considered chemically to be nitro-alcohol ethers or mixed ethers of alkylol aminotriazines but there is much evidence that some other type of condensation takes place especially with such nitro alcohols as 2-nitro-1-butanol. The resins are soluble in alcohols, esters, other common lacquer solvents and may be applied from solution by spraying, roll coating, dipping, brushing or other conventional methods to various surfaces such as wood, metal, glass, paper, textiles, etc. to provide moisture resistant protective coatings. When applied as noted they may be hardened by heating with or without the addition of an acid or acid-reacting catalyst such as diammonium phosphate, ammonium oxalate or other ammonium salts, other acid reacting salts, etc. These catalysts may be acidic or may be of the latent type which develop acidity when heated with the resin.

For uses in protective coating applications the resins of this invention may be modified by the addition of conventional coating ingredients such as fibers, fillers, pigments, dyes, lubricants, synthetic and natural resins, for example, alkyd resins, phenolic resins, vinyl resins, kauri, drying oils, for example, linseed oil, tung oil, etc.

The water soluble resins of this invention are particularly useful in the textile and paper industry.

*Example V*

Cotton sheeting was dipped into a 10% solids solution of a resin such as shown in Example III in a 50–50 (by weight) water-methanol solvent. The fabric was squeezed to give an ultimate pickup of 10% of resin on a dry fabric basis. The fabric was dried at room temperature and then heated for ½ hour at 250° C. to cure the resin. The treated fabric had a soft hand, exhibited low anion (chlorine) pickup in bleaching treatment and showed little shrinkage on washing.

Acid or acid-reacting catalysts previously described may be added to resin solutions used for treatment of textiles to shorten the curing time or lower the temperature of cure of the resin.

A 9" by 8" sample of the cotton sheet treated as shown in Example V was bleached by treatment with 400 cc. of 14% sodium hypochlorite solution for 5 minutes at room temperature and then washed thoroughly until a sample of the wash water gave no blue test with potassium iodide-starch solution. The fabric was dried and then agitated in 400 cc. of a water solution containing 10 cc. of 5% potassium iodide and 5 cc. of starch solution for five minutes. The solution was then titrated with N/100 $Na_2S_2O_3$ until blue color disappeared and the amount of chlorine calculated. The chlorine pickup of the treated fabric was only 0.002% as compared with a similar fabric treated with a methyl ether of methylol melamine in which case the chlorine pickup was 0.024%.

The reduction of chlorine pickup in the bleaching operation is particularly advantageous to the textile industry since retained chlorine tends to weaken the fabric and gradually causes deterioration.

Other fabrics may be treated in a similar manner to shrinkproof and/or crease-proof them and render them less susceptible to anion pickup during subsequent operations such as bleaching. The amount of resin absorbed on the fabric may be substantially varied from a small amount up to about 15% by weight on a dry fabric basis.

Paper may be treated with the water soluble nitro alcohol modified resins of this invention, either by impregnating a web or adding a solution of the nitro alcohol modified resins to the pulp fibers in a beater or Hollander. If desired the resin may be precipitated on the web or fibers by the addition of acids or acid salts. The treated paper has increased wet and dry strength, and increased moisture resistance.

The above description is given in illustration and not in limitation of this invention as described in the appended claim.

What is claimed is:

A heat-curable, resinous material which consists of the product obtained by reacting at elevated temperatures under acid conditions 1 mol of a methylol melamine with 10 mols of 2-nitro-2-methyl-1-propanol.

MILTON J. SCOTT.

REFERENCES CITED

The following references are of record in the file of this patent:

UNITED STATES PATENTS

| Number | Name | Date |
|---|---|---|
| 2,187,566 | Bruson | Jan. 16, 1940 |
| 2,314,308 | Ellis | Mar. 16, 1943 |
| 2,315,401 | D'Alelio | Mar. 30, 1943 |
| 2,339,622 | D'Alelio | Jan. 18, 1944 |
| 2,339,768 | D'Alelio | Jan. 25, 1944 |
| 2,347,436 | Root | Apr. 25, 1944 |
| 2,426,128 | Trowell | Aug. 19, 1947 |